United States Patent
Yamamoto et al.

(10) Patent No.: US 10,452,901 B2
(45) Date of Patent: Oct. 22, 2019

(54) IMAGE PROCESSING DEVICE, IMAGE PROCESSING METHOD, AND PROGRAM

(71) Applicant: Seiko Epson Corporation, Tokyo (JP)

(72) Inventors: Takayuki Yamamoto, Matsumoto (JP); Hironobu Inada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 344 days.

(21) Appl. No.: 14/928,895

(22) Filed: Oct. 30, 2015

(65) Prior Publication Data

US 2016/0132724 A1 May 12, 2016

(30) Foreign Application Priority Data

Nov. 10, 2014 (JP) .................. 2014-227808

(51) Int. Cl.
*G06K 9/00* (2006.01)
*G07D 7/20* (2016.01)
*G06K 9/46* (2006.01)
*H04N 1/387* (2006.01)
(Continued)

(52) U.S. Cl.
CPC ....... *G06K 9/00442* (2013.01); *G06K 9/4661* (2013.01); *G06T 5/50* (2013.01); *G07D 7/1205* (2017.05); *G07D 7/2016* (2013.01); *H04N 1/387* (2013.01); *H04N 1/3871* (2013.01); *G06T 2207/20221* (2013.01)

(58) Field of Classification Search
CPC ................................................ G06K 9/00442
See application file for complete search history.

(56) References Cited

U.S. PATENT DOCUMENTS 7,377,425 B1 * 5/2008 Ma .................. G06Q 20/042
235/379
2002/0085099 A1 * 7/2002 Hirasawa ............ H04N 5/253
348/222.1
(Continued)

FOREIGN PATENT DOCUMENTS

JP 11-086074 3/1999
JP 2006-244097 A 9/2006
(Continued)

*Primary Examiner* — Dave Czekaj
*Assistant Examiner* — Berteau Joisil
(74) *Attorney, Agent, or Firm* — Workman Nydegger

(57) ABSTRACT

An image processing device combines an image of a medium exposed to visible light and an image of the medium exposed to ultraviolet light so that parts printed with UV ink can be easily identified. A control device (image processing device) has an image acquisition unit that drives an image sensor and acquires a first image by imaging the face of a check when exposed to a visible first light, and acquires a second image by imaging the face of the check when exposed to an ultraviolet second light; a reverse image generating unit that generates a reversed second image by reversing light and dark in the second image; and a second synthesizing unit that generates a second synthesized image by combining the first image and the reversed second image. Because the reversed second image that is the reverse of the second image becomes an image that is light overall, a drop in the luminance and a drop in the contrast of the first synthesized image can be suppressed, and parts printed with UV ink are easily discerned.

8 Claims, 9 Drawing Sheets

(51) Int. Cl.
*G06T 5/50* (2006.01)
*G07D 7/1205* (2016.01)

(56) References Cited

U.S. PATENT DOCUMENTS

| | | | |
|---|---|---|---|
| 2013/0034290 A1* | 2/2013 | Lee | G07D 7/12 |
| | | | 382/135 |
| 2013/0077136 A1 | 3/2013 | Motoyama | |
| 2014/0079341 A1* | 3/2014 | Ishigami | H04N 1/3872 |
| | | | 382/309 |
| 2014/0347493 A1* | 11/2014 | Higashitsutsumi | H04N 5/2254 |
| | | | 348/164 |

FOREIGN PATENT DOCUMENTS

| JP | 2012-182626 A | 9/2012 |
|---|---|---|
| JP | 2013-070225 A | 4/2013 |

\* cited by examiner

IMAGE PROCESSING DEVICE, IMAGE PROCESSING METHOD, AND PROGRAM

BACKGROUND

1. Technical Field

The present invention relates to an image processing device that drives an image sensor to acquire an image of a medium when exposed to visible light and an image of the medium exposed to ultraviolet light, and to an image processing method and a program.

2. Related Art

When a check is presented to a financial institution, the check is read by a check processing device, magnetic ink characters printed on the check are magnetically read, and payment is processed based on the acquired magnetic information. Parallel to reading the magnetic ink characters, the check processing device also emits visible light to the front of the check to capture an image of the check, and the financial institution stores the acquired check image as proof of the transaction. When a check bearing a security image printed with UV ink that fluoresces when exposed to ultraviolet light to prevent forgery is presented to a financial institution, the check processing device reads the front of the check with UV light by exposing it to UV light, and the acquired check image is used to determine the authenticity of the check. The financial institution also saves the check image captured using ultraviolet light as proof of the transaction.

One example of a check processing device that can be used in such check payment processes is described in JP-A-2013-70225. The check processing device described in JP-A-2013-70225 has a magnetic sensor for magnetically reading magnetic ink characters, and an image sensor for exposing the surface of the check to light and optically imaging the check. The image sensor images the check using both visible light and ultraviolet light.

A problem with storing an image of the check exposed to visible light and an image of the check exposed to ultraviolet light as proof of payment by a check is that the amount of image data to be stored increases. To reduce the amount of image data stored as proof of a transaction, the image of the check when exposed to visible light and the image of the check when exposed to ultraviolet light could conceivably be combined to store a single synthesized image.

However, in an image that is captured by the image sensor reading the surface of the check when exposed to ultraviolet light, the portions that capture the reflection of ultraviolet light reflected from the surface of the check are dark, and the portions that image the fluorescence of the portions printed with UV ink are light gray scale images. Furthermore, because the area of the portion printed with UV ink is small compared with the total area of the check, the check image is dark overall. Therefore, when the image of the check exposed to visible light and the image of the check exposed to ultraviolet light are combined, contrast drops in the synthesized image and the security image becomes hard to recognize.

SUMMARY

An objective of the present invention is to provide an image processing device and an image processing method that combine an image of the medium when exposed to visible light and an image of the medium when exposed to ultraviolet light so that the portion printed with UV ink can be easily determined. A further objective of the invention is to provide a program for a control device that controls driving the image processing device of the invention.

To solve the foregoing problem, an image processing device according to the invention includes an image acquisition unit that drives an image sensor, acquires a first image by reading a surface of a medium exposed to a visible first light, and acquires a second image by reading a surface of the medium exposed to an ultraviolet second light; a reverse image generating unit that generates a reversed second image by reversing light and dark in the second image; and a synthesizing unit that generates a synthesized image by combining the first image and the reversed second image.

To combine a first image of a medium exposed to a visible first light with a second image of the medium when exposed to an ultraviolet second light, the invention generates a reversed second image by reversing light and dark in the second image, and combines this reversed second image with the first image. The second image acquired by scanning the surface of the medium exposed to the second light with an image sensor becomes an image that is dark overall when the area occupied by the parts printed with UV ink is small compared with the total surface area of the medium. The reversed second image will therefore become an image that is light overall if the reversed second image is generated by reversing light and dark in the second image. A drop in luminance and a drop in contrast in the synthesized image can therefore be prevented by combining the reversed second image with the first image. Furthermore, because the image parts capturing fluorescence from parts printed with UV ink in the second image are light, the parts printed with UV ink become a low luminance black color in the reversed second image. The parts printed with UV ink can therefore be easily discerned in the synthesized image obtained by combining the reversed second image and the first image. Note that the parts printed with UV ink become a reverse image with light and dark reversed in the synthesized image, but the parts printed with UV ink can also be easily confirmed in the reverse image.

Preferably in the invention, the second image includes an image part based on fluorescence from UV ink. Thus comprised, the surface of a check having a security image printed with UV ink can be imaged, and a synthesized image combining the image of the check with the reverse image of the security image can be generated.

An image processing method according to the invention comprises: acquiring a first image by reading a surface of a medium exposed to a visible first light, and acquiring a second image by reading a surface of the medium exposed to an ultraviolet second light, by an image sensor; generating a reversed second image by reversing light and dark in the second image; and generating a synthesized image by combining the first image and the reversed second image.

To combine a first image of a medium exposed to a visible first light with a second image of the medium when exposed to an ultraviolet second light, the invention generates a reversed second image by reversing light and dark in the second image, and combines the first image with the reversed second image. The reversed second image becomes an image that is light overall if the portion printed with UV ink is small. A drop in luminance and a drop in contrast in the synthesized image can therefore be prevented by combining the reversed second image with the first image. Furthermore, because the parts printed with UV ink become a low luminance black color in the reversed second image, the parts printed with UV ink can be easily discerned in the synthesized image. Note that the parts printed with UV ink become a reverse image with light and dark reversed in the synthesized image, but the parts printed with UV ink can also be easily confirmed in the reverse image.

Preferably in the invention, the second image includes an image part based on fluorescence from UV ink. Thus comprised, the surface of a check having a security image printed with UV ink can be read, and a synthesized image combining the image of the check with the reverse image of the security image can be generated.

Another aspect of the invention is a program that operates on a control device that controls driving an image sensor, the program causing the control device to function as: an image acquisition unit that drives the image sensor, acquires a first image by reading a surface of a medium exposed to a visible first light, and acquires a second image by reading a surface of the medium exposed to an ultraviolet second light; a reverse image generating unit that generates a reversed second image by reversing light and dark in the second image; and a synthesized image generating unit that generates a synthesized image by combining the first image and the reverse image.

To combine a first image of a medium exposed to a visible first light with a second image of the medium when exposed to an ultraviolet second light, the invention generates a reversed second image by reversing light and dark in the second image, and combines the first image with the reversed second image. The reversed second image becomes an image that is light overall if the portion printed with UV ink is small. A drop in luminance and a drop in contrast in the synthesized image can therefore be prevented by combining the reversed second image with the first image. Furthermore, because the parts printed with UV ink become a low luminance black color in the reversed second image, the parts printed with UV ink can be easily discerned in the synthesized image. Note that the parts printed with UV ink become a reverse image with light and dark reversed in the synthesized image, but the parts printed with UV ink can also be easily confirmed in the reverse image.

DESCRIPTION OF EMBODIMENTS

Figure 1A:
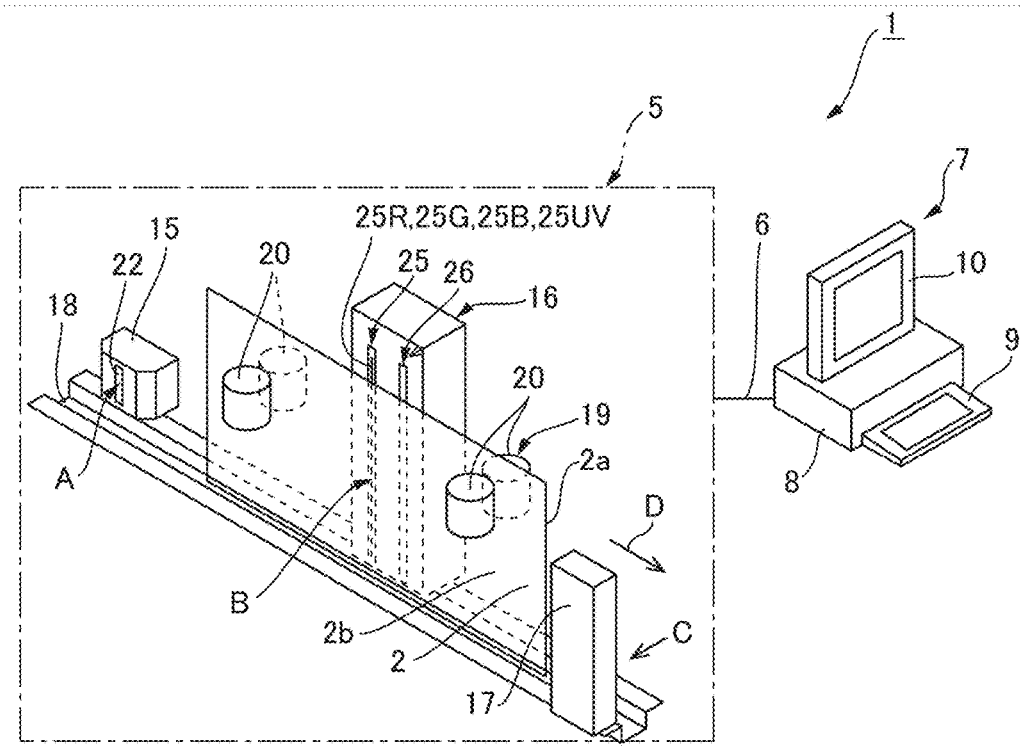
FIGS. 1A and 1B illustrate a check processing system according to the invention.
Figure 1B:
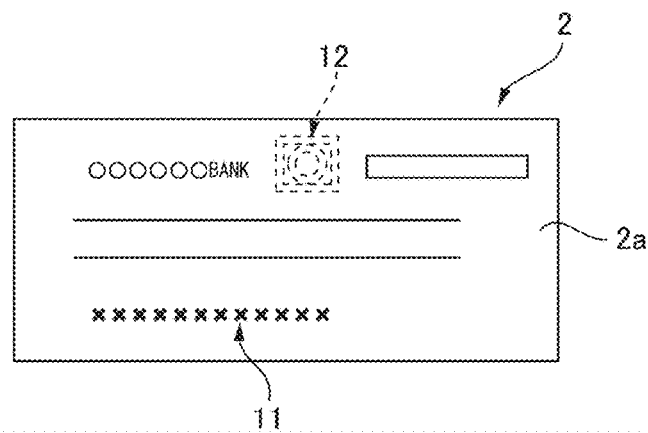

A preferred embodiment of a check processing system applying the present invention is described below with reference to the accompanying figures.
Check Processing System FIG. 1A illustrates a check processing system, and FIG. 1B shows an example of a check. The check processing system 1 executes a payment process using a check 2. As shown in FIG. 1A, the check processing system 1 includes a check processing device 5, and a control device 7 communicatively connected to the check processing device 5 through a cable 6, for example. The control device (image processing device) 7 includes a main unit 8, and an input device 9 and display 10 connected to the main unit 8. The main unit 8 is a computer.

A line and the name of the financial institution, for example, are printed in normal ink on the face 2a of the check 2 presented to a financial institution as shown in FIG. 1B. Magnetic ink characters 11 expressing the customer account number and other information are also printed in magnetic ink on the face 2a of the check 2. A security image 12 that fluoresces when exposed to UV light is also printed on the face 2a of the check 2 using UV ink.

As shown in FIG. 1A, the check processing device 5 has a magnetic sensor 15, an image sensor 16, and a printhead 17. The check processing device 5 also has a conveyance path 18 that passes the magnetic reading position A of the magnetic sensor 15, the image reading position B of the image sensor 16, and the printing position C of the printhead 17. The 5 also has a conveyance mechanism 19 that conveys a check 2 inserted to the conveyance path 18 past the magnetic reading position A, image reading position B, and printing position C. The conveyance mechanism 19 includes a conveyance roller pair 20 that holds and conveys the check 2 inserted to the conveyance path 18, and a conveyance motor (see FIG. 2) that drives the conveyance roller pair 20.

The magnetic sensor 15 is disposed with the magnetic reading surface 22 facing the conveyance path 18. The magnetic sensor 15 reads the magnetic ink characters 11 from the check 2 passing the magnetic reading position A.

The image sensor 16 is a CIS (contact image sensor) module. The image sensor 16 emits light to the check 2 passing the image reading position B and captures the reflection or fluorescence from the check 2. The image sensor 16 is disposed with the photoemitter unit 25 and reading unit (imaging element) 26 facing the conveyance path 18.

The photoemitter unit 25 is disposed on a vertical line perpendicular to the conveyance direction D. The light elements of the photoemitter unit 25 include a plurality of red photoemission elements 25R that emit red light, a plurality of green photoemission elements 25G that emit green light, a plurality of blue photoemission elements 25B that emit blue light, and a plurality of UV photoemission elements 25UV that emit ultraviolet light. The multiple photoemission elements 25R, 25G, 25B, and 25UV that emit respective colors of light are disposed in vertical lines.

The reading unit 26 is displayed in a vertical line along the photoemitter unit 25. The reading unit 26 is an imaging element such as a CMOS sensor. The reading unit 26 (imaging element) reads the check 2 passing the image reading position B sequentially one vertical line at a time timed to emission of the reading beams to the check 2.

The printhead 17 is disposed on the opposite side of the conveyance path 18 as the magnetic sensor 15 and image sensor 16. The printhead 17 is also disposed with the printing surface facing the conveyance path 18. The printhead 17 prints an endorsement on the back 2b of the check 2 passing the printing position C.

The check processing device 5 conveys checks 2 through the conveyance path 18 by means of the conveyance mechanism 19. The check processing device 5 reads the magnetic ink characters 11 from the check 2 passing the magnetic reading position A with the magnetic sensor 15 and acquires magnetic information. The check processing device 5 then sends the read magnetic information to the control device 7.

The check processing device 5 also reads the face 2a of the check 2 from the check 2 passing the image reading position B by means of the image sensor 16, and sequentially sends the scanning information to the control device 7. The check processing device 5 also controls the printhead 17 based on print commands from the control device 7, and prints an endorsement on the check 2 used in the payment process.

The control device 7 receives the magnetic information acquired by the check processing device 5, and executes a payment process based on the input information input from the input device 9.

Figure 4A:
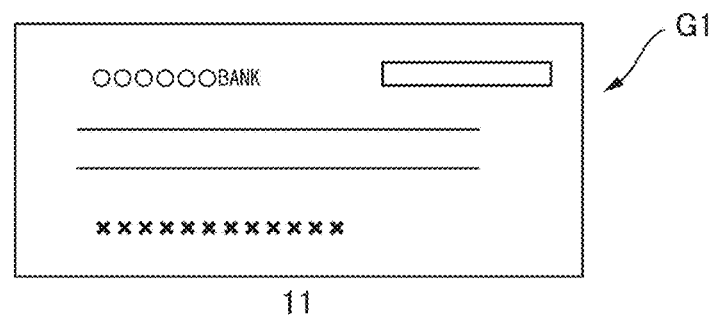
FIGS. 4A and 4B illustrate a first image and a second image captured from a check.
Figure 4A:
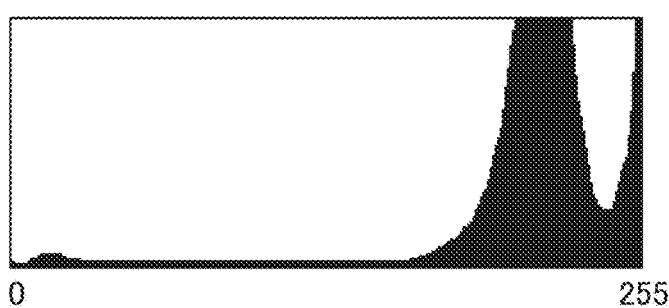
Figure 4B:
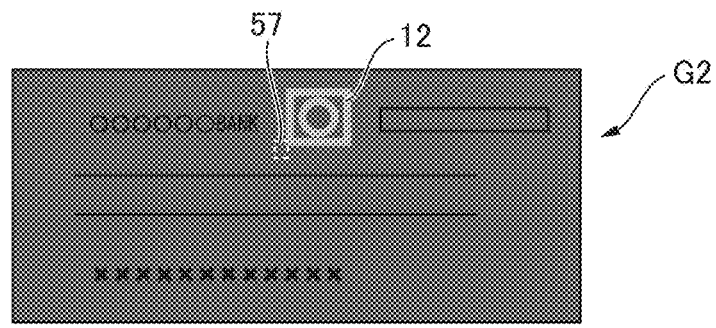
Figure 4B:
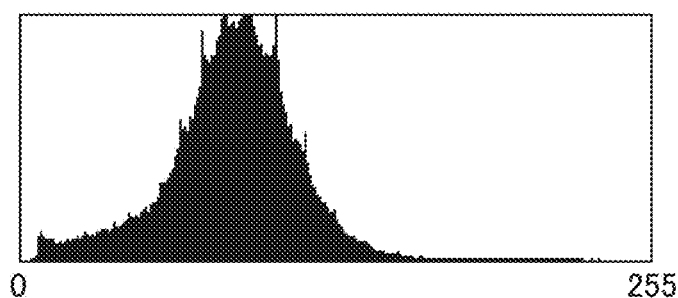

Based on the scanning information (output from the image sensor 16) sequentially sent from the check processing device 5, the control device 7 acquires a first image G1 (first image, see FIG. 4A) and a second image G2 (second image, see FIG. 4B). The first image G1 is a gray scale (composite gray) image captured when the check 2 is exposed to visible light (red light, blue light, green light), and the second image G2 is a gray scale image captured when the check 2 is exposed to ultraviolet light. The first image G1 and second image G2 are composed of pixels corresponding to the resolution of the image sensor 16.

The control device 7 image processes at least one of the acquired first image G1 and second image G2, and then generates a synthesized image combining these images. The control device 7 stores the generated synthesized image as proof of the payment process.

Figure 8A:
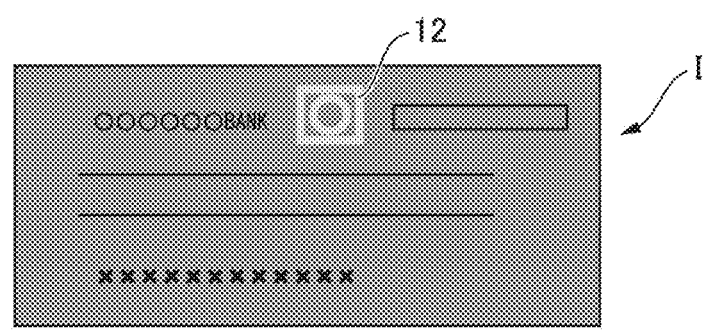
FIGS. 8A and 8B describe a first synthesized image.
Figure 9A:
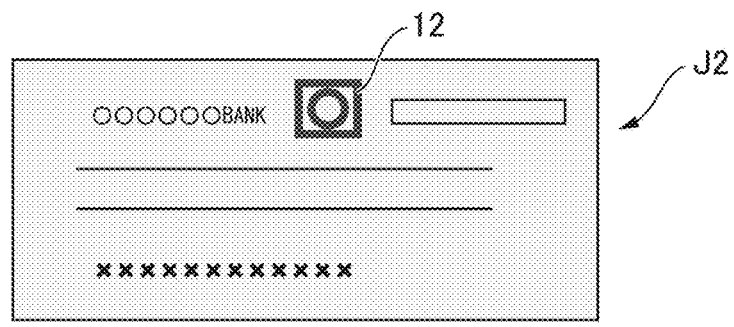
FIGS. 9A and 9B describe an inverted second image and a second synthesized image.
Figure 9B:
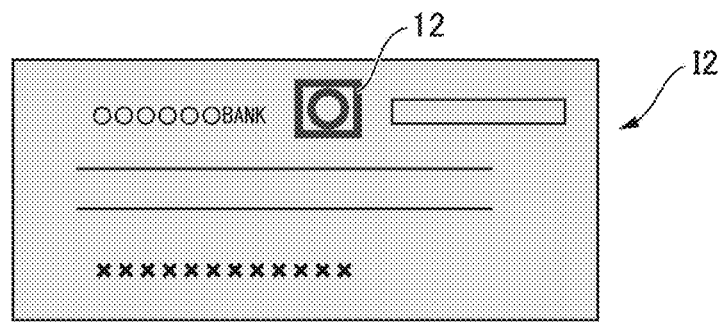

The control device 7 can create two types of synthesized images, a first synthesized image I1 (see FIG. 8A) and a second synthesized image I2 (see FIG. 9B). The first synthesized image I1 is created by generating a first corrected image that reduces the luminance of the first image G1, and a second corrected image that increases the contrast of the second image G2, and then combining the first corrected image and second corrected image. The second synthesized image I2 is created by generating a reversed second image by reversing light and dark values in the second image G2, and then combining the first image G1 and the reversed second image. The control device 7 generates one of the synthesized images based on synthesized image selection information previously input by the operator.

When the payment process ends, the control device 7 sends a print command to the check processing device 5 and drives the check processing device 5 to print an endorsement on the check 2.

Control System of the Check Processing Device

Figure 2:
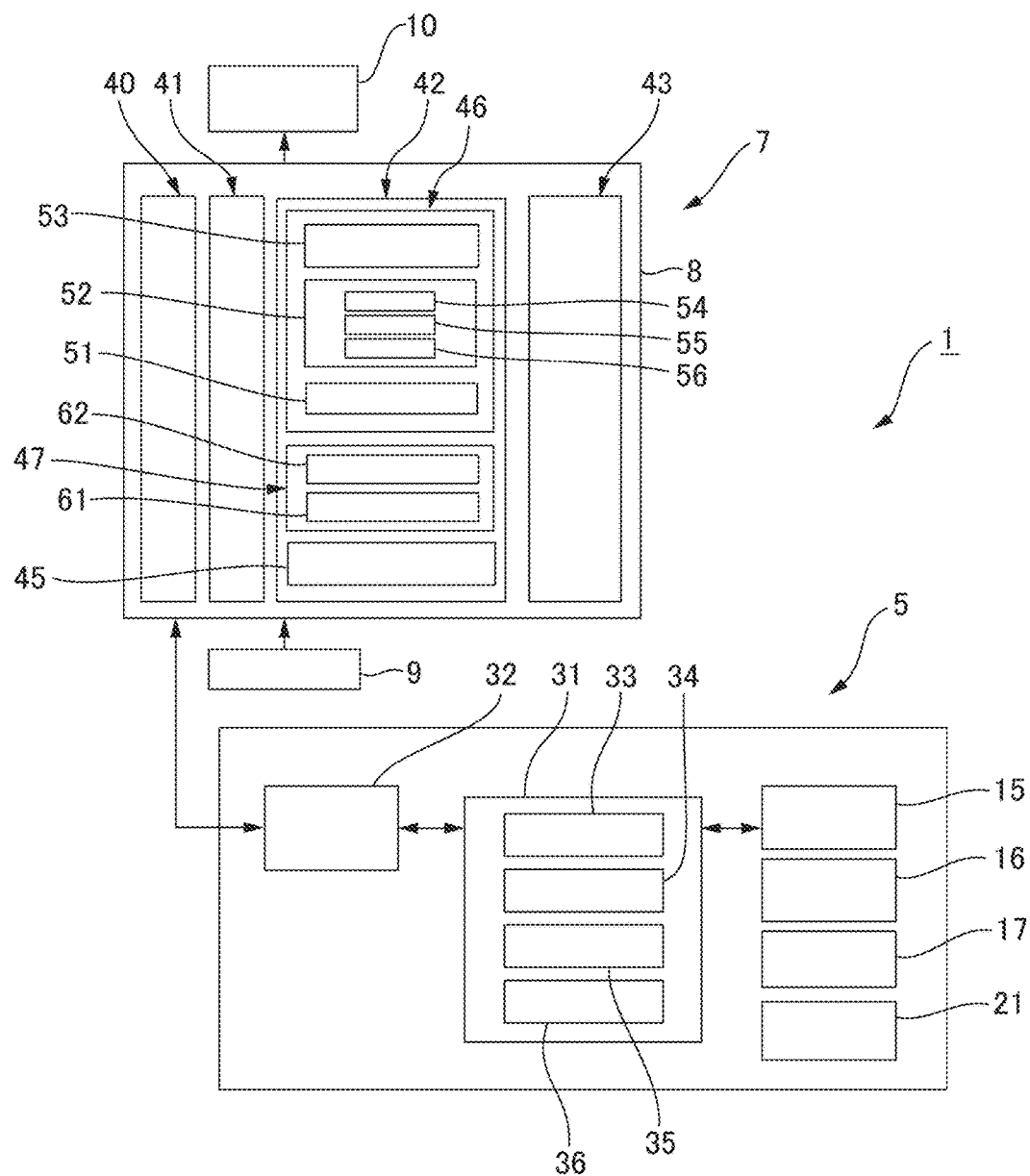
FIG. 2 is a block diagram of the control system of the check processing system.
Figure 3:
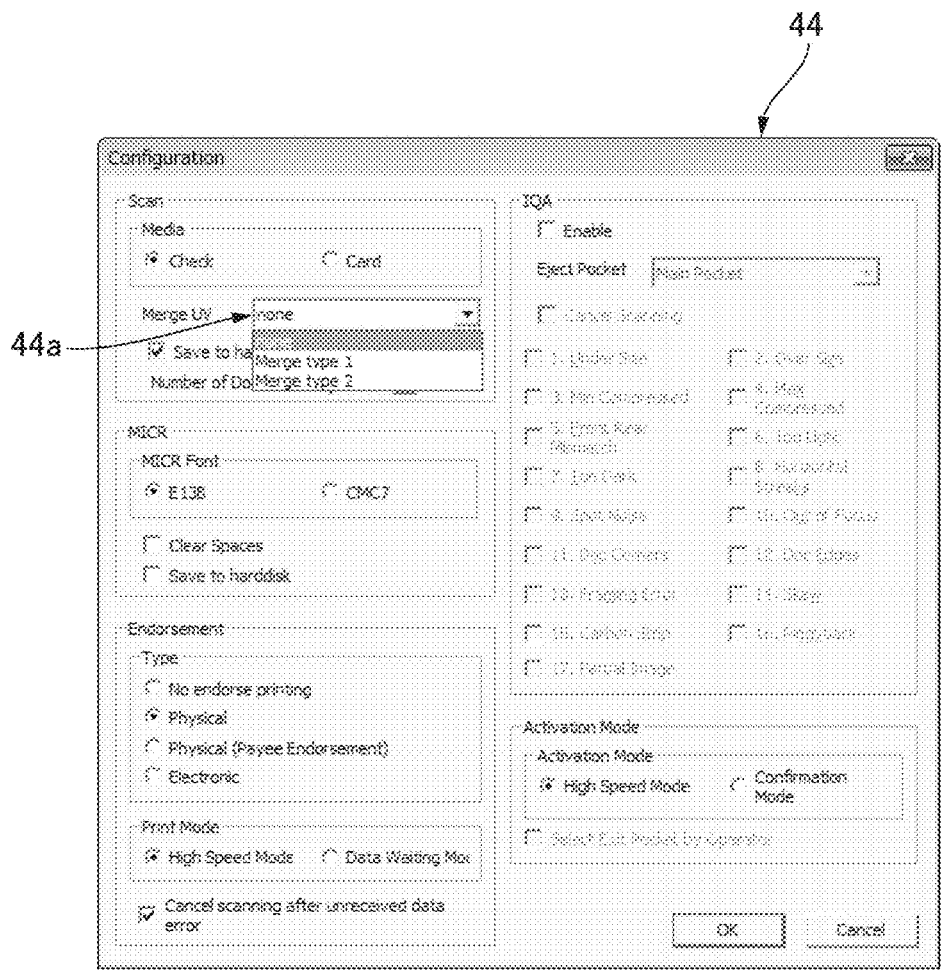
FIG. 3 shows an example of a dialog box presented on the display of the control device.

FIG. 2 is a block diagram illustrating the control system of the check processing system 1. FIG. 3 illustrates a dialog box for selecting the synthesized image. FIG. 4 describes the first image G1 and second image G2. FIG. 5 describes the first corrected image and second corrected image.

As shown in FIG. 2, the control system of the check processing device 5 is configured around a control unit 31 comprising a CPU. A communication unit 32 with a communication interface for communicating with the control device 7 is connected to the control unit 31. The magnetic sensor 15, image sensor 16, printhead 17, and conveyance motor 21 are also connected to the control unit 31 through drivers not shown.

A control program operates on the control unit 31. The control program causes the control unit 31 to function as a conveyance control unit 33, magnetic information acquisition unit 34, image scanning unit 35, and print unit 36. The control unit 31 therefore includes a conveyance control unit 33, magnetic information acquisition unit 34, image scanning unit 35 and print unit 36.

The conveyance control unit 33 controls driving the conveyance motor 21 to convey a check 2 through the conveyance path 18.

The magnetic information acquisition unit 34 drives the magnetic sensor 15 to acquire magnetic reading information (detection signal) from the magnetic ink characters 11 of the check 2 passing the magnetic reading position A. Based on the magnetic reading information, the magnetic information acquisition unit 34 recognizes the magnetic ink characters 11. Recognition of the magnetic ink characters 11 is done by comparing the magnetic reading information output from the magnetic sensor 15 with the previously stored signal waveform patterns of the magnetic ink characters 11. The magnetic information acquisition unit 34 acquires the result of recognizing the magnetic ink characters 11 as magnetic information. When the magnetic information is acquired, the magnetic information acquisition unit 34 outputs the magnetic information to the control device 7.

The image scanning unit 35 drives the image sensor 16 to read the face 2a of the check 2 passing the image reading position B.

When scanning the face 2a of the check 2 with the image sensor 16, the image scanning unit 35 sequentially emits red light, green light, blue light, and ultraviolet light from the photoemitter unit 25 to the face 2a of the check 2 at the image reading position B while advancing the check 2 the distance of one line, which is determined by the scanning resolution. Each time the check 2 is advanced the distance of one line, the image scanning unit 35 controls the reading unit 26 to sequentially capture a one-line image of the check 2 when exposed to red light, an image of one line of the check 2 when exposed to blue light, an image of one line of the check 2 when exposed to green light, and an image of one line of the check 2 when exposed to ultraviolet light. The image scanning unit 35 then sequentially sends the scanning information output from the reading unit 26 when red light is emitted, the scanning information output from the reading unit 26 when blue light is emitted, the scanning information output from the reading unit 26 when green light is emitted, and the scanning information output from the reading unit 26 when ultraviolet light is emitted to the control device 7.

The print unit 36 drives the printhead 17 based on print commands output from the control device 7 to print on the back 2b of the check 2 passing the printing position C.

Control System of the Control Device

As shown in FIG. 2, the control device 7 has a check processing device control unit 40, a synthesized image selection unit 41, an image processing unit 42, and a payment processing unit 43. The control device 7 functions as the check processing device control unit 40, synthesized image selection unit 41, image processing unit 42, and payment processing unit 43 as a result of a program running on the main unit 8.

The check processing device control unit 40 sends a start processing command that starts the check scanning operation to the check processing device 5. The check scanning operation is an operation that conveys the check 2 through the conveyance path 18 and sends the captured magnetic information and scanning information to the control device 7.

The synthesized image selection unit 41 displays a dialog box 44 on the display 10, and accepts input of synthesized image selection information. FIG. 3 shows an example of the dialog box 44 the synthesized image selection unit 41 presents on the display 10. The synthesized image selection information specifies whether to use the first synthesized image I1 or the second synthesized image I2 as the synthesized image that is stored as proof of the payment process.

A pulldown menu 44a for selecting the first synthesized image I1 or second synthesized image I2 is provided in the dialog box 44. In this example, if the operator selects "Merge type 1" from the pulldown menu 44a, synthesized image selection information specifying the first synthesized image I1 as the synthesized image is input to the control device 7. If the operator selects "Merge type 2" from the pulldown menu 44a, synthesized image selection information specifying the second synthesized image I2 as the synthesized image is input to the control device 7.

The image processing unit 42 has an image acquisition unit 45 that acquires the first image G1 based on the scanning information output from the reading unit 26 while visible light (red light, green light, blue light) is emitted, and acquires the second image G2 based on the scanning information output from the reading unit 26 while ultraviolet light is emitted. The image processing unit 42 also has a first synthesized image generating unit 46 that generates the first synthesized image I1, and a second synthesized image generating unit 47 that generates the second synthesized image I2.

The image acquisition unit 45 acquires the first image G1 based on the scanning information output from the reading unit 26 while red light is emitted, the scanning information output from the reading unit 26 while blue light is emitted, and the scanning information output from the reading unit 26 while green light is emitted. The first image G1 acquired by the image acquisition unit 45 is the image shown on top in FIG. 4A. The figure on the bottom in FIG. 4A is a histogram of the distribution of brightness (luminance) in the first image G1. Note that this image represents brightness by luminance values because it is displayed on the display 10. Luminance values are on the X-axis in the histogram, and the count (pixel count) is on the Y-axis. As described above, the first image G1 is a gray scale image. There are 256 luminance values representing brightness with a luminance value of 0 being the darkest (black) and a luminance value of 255 being the brightest (white).

The image acquisition unit 45 also acquires the second image G2 based on the scanning information output from the reading unit 26 while ultraviolet light is emitted. A second image G2 acquired by the image acquisition unit 45 is shown on the top in FIG. 4B. The figure on the bottom in FIG. 4B is a histogram of the distribution of brightness (luminance) in the second image G2. In the second image G2, areas imaging the reflection (ultraviolet rays) of the scanning beam reflected from the surface of the check 2 are dark (luminance is low), and areas imaging the fluorescence produced by the portions printed with UV ink are light (luminance is high).

The first synthesized image generating unit 46 operates when synthesized image selection information specifying the first synthesized image I1 as the synthesized image is input to the control device 7. The first synthesized image generating unit 46 has a first corrected image generating unit 51 that corrects the first image G1, a second corrected image generating unit 52 that corrects the second image G2, and a first synthesizing unit 53 that combines the first corrected image H1 resulting from correcting the first image G1 and the second corrected image H2 resulting from correcting the second image G2.

Figure 5A:
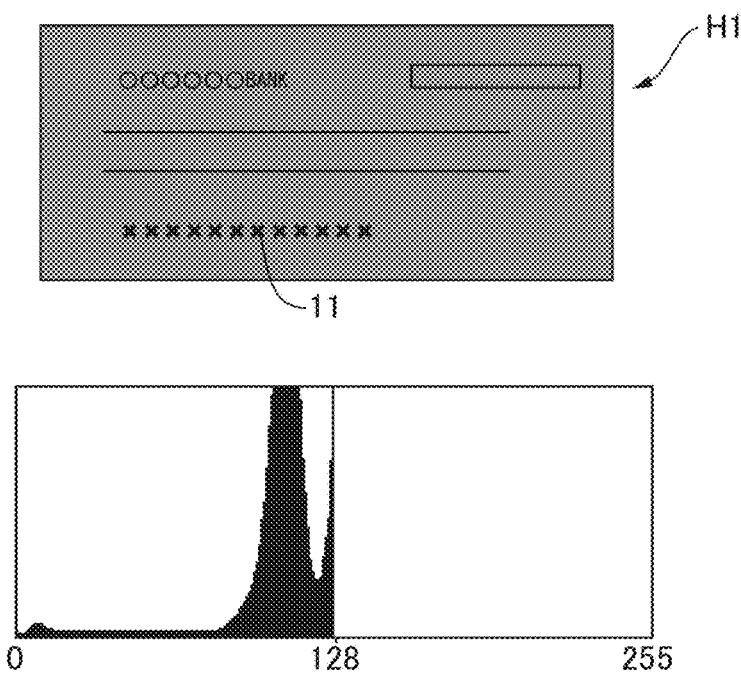
FIGS. 5A and 5B illustrate a first corrected image and a second corrected image.

The first corrected image generating unit 51 generates the first corrected image H1 by reducing the luminance of each pixel in the first image G1 a constant rate. In this example, the luminance of each pixel in the first image G1 is reduced 50%. A first corrected image H1 generated by the first corrected image generating unit 51 is shown on the top in FIG. 5A. The figure on the bottom in FIG. 5A is a histogram of the distribution of brightness (luminance values) in the first corrected image H1. The first corrected image H1 is a darker image (has lower luminance) than the first image G1 shown in FIG. 4.

The second corrected image generating unit 52 has an edge extraction unit 54, a correction function generating unit 55, and a corrected luminance image generating unit 56.

When a second image G2 is acquired, the edge extraction unit 54 extracts parts of the second image G2 as edge areas. An edge area is extracted using the luminance value of each pixel in the second image G2. An edge area is an area including a part of the image where the difference of the luminance values of a first pixel and an adjacent second pixel is greater than a preset luminance difference. An edge area is also an area including apart of the image where the luminance value of the first pixel, which has a higher luminance value than the second pixel, is greater than the average luminance Ave of all pixels in the second image G2.

Figure 6:
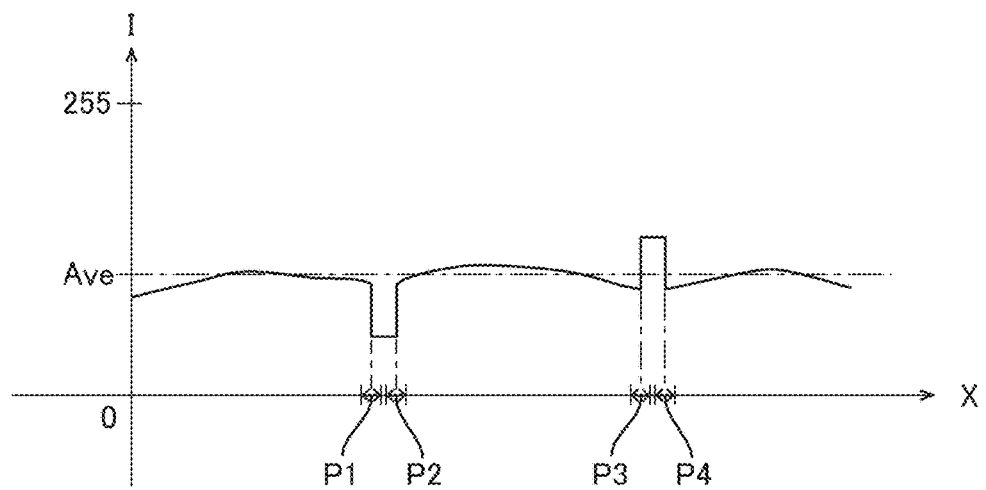
FIG. 6 is a graph of luminance values in the check image.

FIG. 6 is a graph of the luminance of part of a pixel train in the second image G2 passing through the security image 12 in the lengthwise direction of the check 2 (the direction corresponding to the conveyance direction D). The pixel positions are shown on the X-axis, and the luminance (0-255) of the pixel at that position is shown on the Y-axis. A luminance value of 0 is black, and a luminance value of 255 is white.

In the example shown in FIG. 6, there are four image parts, P1, P2, P3, P4, where the luminance difference of a first pixel and the adjacent second pixel is greater than a specific luminance difference. In image parts P1 and P2, the luminance of the high luminance first pixel is lower than the average luminance Ave of all pixels in the image. In image parts P3 and P4, the luminance of the high luminance first pixel is higher than the average luminance Ave of all pixels in the image.

The luminance of image parts capturing the fluorescence produced by UV ink is higher than the average luminance Ave of all pixels in the image even when the density of the UV ink is low. Image parts P3, P4 including pixels with higher luminance than the average luminance Ave are therefore images of parts printed with UV ink. The edge extraction unit 54 therefore extracts image part P3 or image part P4 as an edge area. An extracted edge area 57 is an area such as shown in FIG. 4 B. Note that parts P1 and P2 are parts where there is a pattern on the face of the check 2 or where there is printing with normal ink.

Figure 7A:
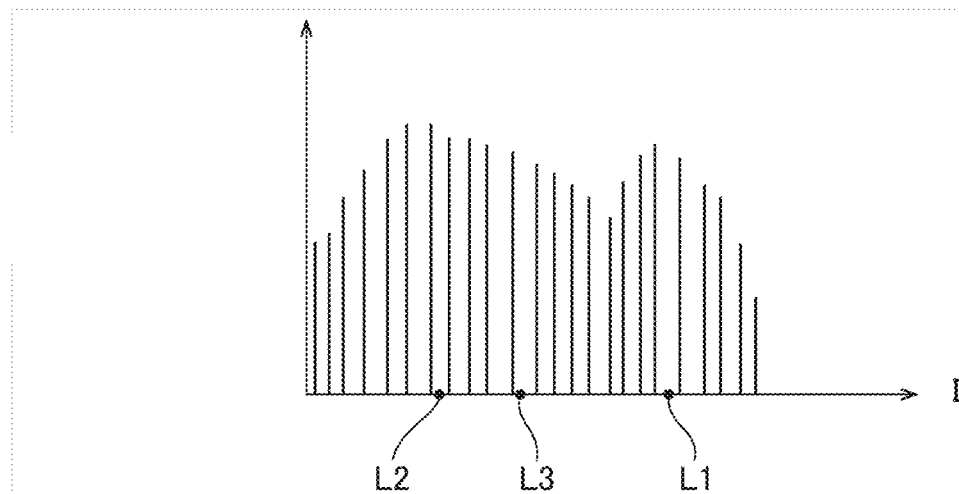
FIGS. 7A and 7B show a histogram of luminance values in edge areas and describe a correction function.
Figure 7B:
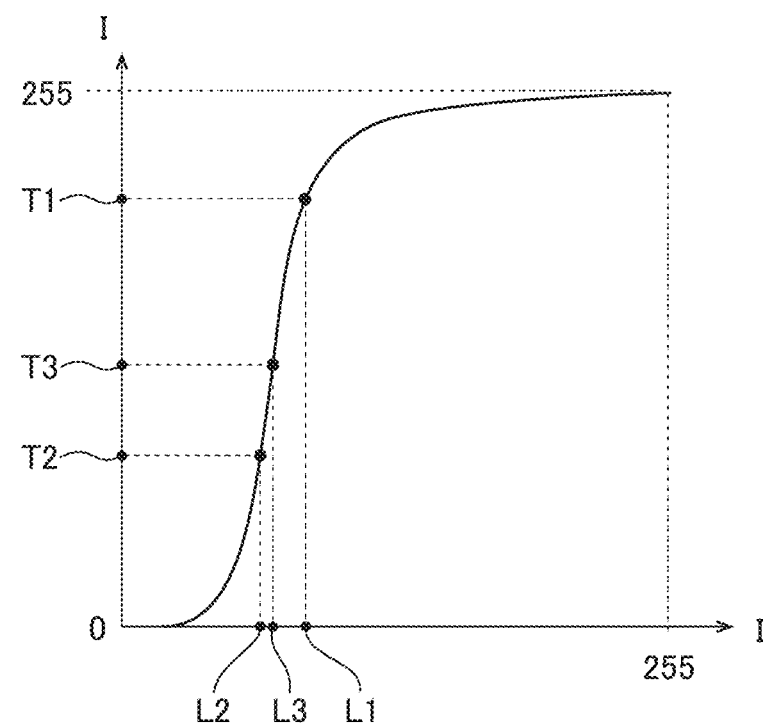

The correction function generating unit 55 separates the plural pixels contained in the edge area 57 into a first pixel group and a second pixel group based on the luminance values. FIG. 7A is a histogram of the distribution of brightness (luminance values) of the plural pixels in the edge area 57. FIG. 7B is a graph of a correction function.

As shown in FIG. 7A, the histogram of the distribution of the brightness (luminance values) of the plural pixels in the edge area 57 have a bimodal distribution formed by a high luminance peak and a low luminance peak. The correction function generating unit 55 therefore groups the plural pixels into a first pixel group and a second pixel group with lower luminance than the first pixel group using an algorithm for finding a threshold value for separating the plural values of the bimodal distribution into two groups. The discriminant analysis method is one example of an algorithm for finding the threshold value for dividing plural values with a bimodal distribution into two groups.

The correction function generating unit 55 generates a correction function that corrects the luminance value of each pixel so that the contrast between the pixels in the first pixel group and the pixels in the second pixel group increases. The correction function generating unit 55 generates the correction function based on a first average luminance L1 that averages the luminance values of the pixels in the first pixel group, a second average luminance L2 that averages the luminance values of the pixels in the second pixel group, and a third average luminance L3 that averages the first average luminance L1 and the second average luminance L2.

The generated correction function corrects the luminance values of the pixels of the first average luminance L1 to a first target luminance T1, corrects the luminance values of the pixels of the second average luminance L2 to a second target luminance T2, and corrects the luminance values of the pixels of the third average luminance L3 to a third target luminance T3.

The first target luminance T1 is greater than the second target luminance T2 and the third target luminance T3, and is lower than the maximum luminance value (255 in this example).

The second target luminance T2 is lower than the third target luminance T3, and is lower than the minimum luminance value (0 in this example).

The correction function corrects the luminance value of each pixel so that a first difference between the first target luminance T1 and the first average luminance L1 is greater than a second difference between the second target luminance T2 and the second average luminance L2 and is greater than a third difference between the third target luminance T3 and the third average luminance L3, and the second difference is less than the third difference.

In this example, the first average luminance L1 is 54.02, and the first target luminance T1 is 200. The first difference is therefore 145.98. The second average luminance L2 is 41.64, and the second target luminance T2 is 63. The second difference is therefore 21.36. The third average luminance L3 is 47.83, and the third target luminance T3 is 127. The third difference is 79.17.

An example of the correction function generated by the correction function generating unit 55 is shown in FIG. 7B. The luminance values (input luminance values) of the pixels before correction are shown on the X-axis in FIG. 7B, and the luminance values (corrected luminance values) of the pixels after correction are shown on the Y-axis. The correction function in this example may be represented by a Bézier curve or a sigmoid curve, for example.

The first target luminance T1 is lower than the maximum luminance value (255 in this example) to prevent or suppress the luminance of the second corrected image obtained by correcting the second image G2 with the correction function from becoming saturated at the maximum luminance. The correction function can also be generated with the second target luminance T2 lower than the second average luminance L2.

Figure 5B:
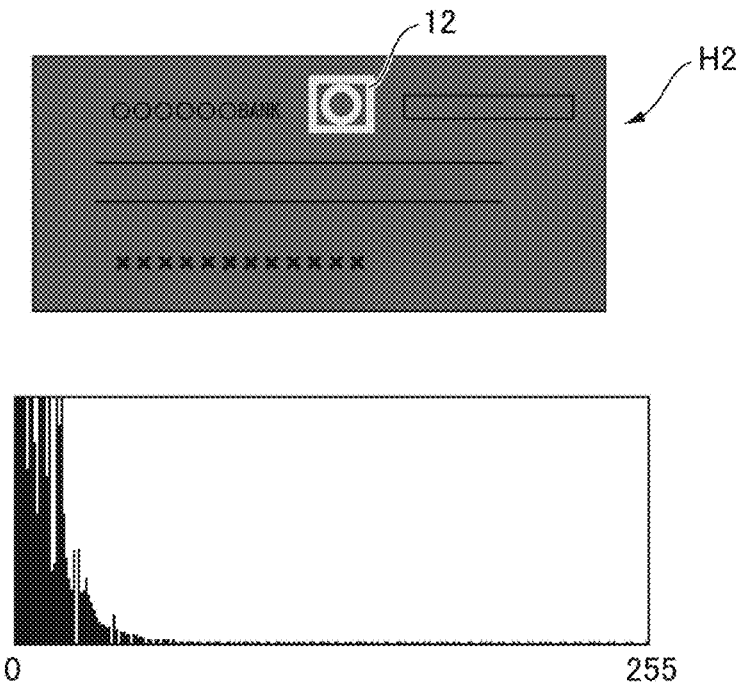

The corrected luminance image generating unit 56 generates a second corrected image H2 in which the luminance value of each pixel in the second image G2 is corrected with the correction function. An example of the second corrected image H2 is shown on the top in FIG. 5B. The image on the bottom in FIG. 5B is a histogram of the distribution of brightness (luminance values) in the second corrected image H2. The second corrected image H2 shown in FIG. 5B is an image with greater contrast than the second image G2 shown in FIG. 4B.

Figure 8B:
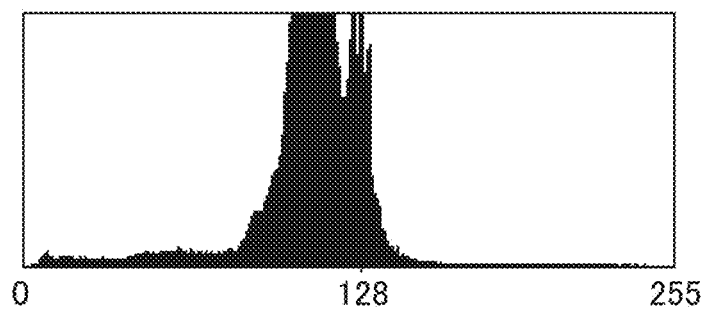

The first synthesizing unit 53 combines the first corrected image H1 and the second corrected image H2 to create the first synthesized image I1. FIG. 8A shows an example of the synthesized image generated by the first synthesizing unit 53, and FIG. 8B is a histogram of the distribution of brightness (luminance values) in the synthesized image.

The first synthesizing unit 53 combines corresponding pixels in the first corrected image H1 and the second corrected image H2. The first synthesizing unit 53 combines the first corrected image H1 and second corrected image H2 so that the luminance of a synthesized pixel combining a pixel in the first corrected image H1 and a pixel in the second corrected image H2 is greater than or equal to the luminance of that pixel in the first corrected image H1 and is greater than or equal to the luminance of that pixel in the second corrected image H2.

In this example, the first synthesizing unit 53 combines pixels in the first corrected image H1 and pixels in the second corrected image H2 based on the following equation (1). In equation (1), Im is the luminance of the synthesized pixel, I1 is the luminance of the pixel in the first corrected image H1, and I2 is the luminance of the pixel in the second corrected image H2.

$$Im = 255 \times (1 - (1 - I1/255) \times (1 - I2/255)) \qquad (1)$$

The synthesizing method based on equation (1) reverses negative and positive values in the first corrected image H1 and reverses negative and positive values in the second corrected image H2, superimposes the pixels in the reversed first corrected image H1 with the pixels in the reversed second corrected image H2, and then reverses negatives and positives in the combined image to create the first synthesized image I1.

An example of the first synthesized image I1 produced by the first synthesizing unit 53 is shown in FIG. 8A. The first synthesized image I1 combines the first corrected image H1 in which the luminance of the first image G1 is reduced with the second corrected image H2 in which the contrast of the second image G2 is increased. The synthesizing method of the first synthesizing unit 53 does not reduce the luminance of the synthesized pixels in the first synthesized image I1 combining pixels in the first corrected image H1 with pixels in the second corrected image H2. As a result, because the luminance of pixels in the security image 12 does not drop in the first synthesized image I1, the security image 12 can be easily identified. Content written on the face 2a of the check 2 can also be easily read.

Note that the first synthesizing unit 53 may alternatively combine pixels in the first corrected image H1 and pixels in the second corrected image H2 based on the following equation (2).

$$Im = \max(I1, I2) \qquad (2)$$

When corresponding pixels in the first corrected image H1 and second corrected image H2 are combined by the synthesizing method based on equation (2), the luminance value of the pixel with the higher luminance value of the two pixels is used as the luminance value of the synthesized pixel in the first synthesized image I1.

Next, the second synthesized image generating unit 47 operates when the synthesized image selection information input to the control device 7 specifies the second synthesized image I2 as the synthesized image. As shown in FIG. 2, the second synthesized image generating unit 47 has a reverse image generating unit 61 and a second synthesizing unit 62.

FIG. 9A illustrates a reversed second image J2 generated by the reverse image generating unit, and FIG. 9B illustrates the second synthesized image I2.

The reverse image generating unit 61 generates a reversed second image J2 as a positive-negative reversal of the second image G2 (by reversing light and dark in the second image G2). A reversed second image J2 generated by the reverse image generating unit 61 is shown in FIG. 9A.

As shown on top in FIG. 4B, in the second image G2 acquired based on the scanning information output from the reading unit 26 of the image sensor 16 while ultraviolet light is emitted, the parts imaging the reflection (ultraviolet light) of the scanning light reflected by the surface of the check 2 are dark (luminance is low), and the parts imaging the fluorescence produced by the parts printed with UV ink are light (luminance is high). In addition, because the area occupied by the parts printed with UV ink is small compared with the total area of the face 2a of the check 2, the second image G2 is a dark image overall. As a result, the reversed second image J2 obtained as the reverse of the second image is a bright image overall. Furthermore, because the parts imaging the fluorescence from the parts printed with UV ink in the second image G2 are bright, the security image 12 (the parts printed with UV ink) becomes a low luminance black color in the reversed second image J2.

The second synthesizing unit 62 combines corresponding pixels in the first image G1 and the reversed second image J2. The second synthesizing unit 62 combines the uncorrected first image G1 with the overall bright reversed second image J2. A drop in luminance and a drop in contrast in the second synthesized image I2 can therefore be suppressed. The security image 12 also becomes a low luminance black color in the second synthesized image I2. As a result, content written on the face 2a of the check 2 can be easily read in the second synthesized image I2, and the security image 12 can be easily identified. Note that while the security image 12 becomes a dark image with light and dark reversed in the second synthesized image I2, the security image 12 can also be easily recognized in the reverse image.

The image process whereby the second synthesized image generating unit 47 combines pixels in the reversed second image J2 reversing negative and positive in the second image G2 with the pixels in the first image G1 to generate the second synthesized image I2 is shown in equation (3) below. In equation (3), Im is the luminance of the synthesized pixel, I1 is the luminance of the pixel in the first image G1, and I2 is the luminance of the pixel in the second image G2.

$$Im=255\times(I1/255)\times(1-I2/255)) \quad (3)$$

The payment processing unit 43 executes the payment process based on magnetic information including the account number received from the check processing device 5, and input information such as the amount input to the control device 7 through the input device 9. The payment processing unit 43 also displays the first synthesized image I1 or the second synthesized image I2 generated by the image processing unit 42 on the display 10. The payment processing unit 43 also stores the first synthesized image I1 or the second synthesized image I2 relationally to transaction information including the payment date, the magnetic information, and the input information. The payment processing unit 43 also stores and saves the first synthesized image I1 or second synthesized image I2, and sends a print command for printing an endorsement to the check processing device 5.

Check Processing Operation

In the payment process executed at the financial institution to which the check 2 is presented, the check 2 is inserted to the conveyance path 18 of the check processing device 5, and a start processing command is sent from the control device 7 to the check processing device 5.

As a result, the check processing device 5 conveys the check 2 through the conveyance path 18, reads the magnetic ink characters 11 printed on the check 2 with the magnetic sensor 15, and acquires the magnetic information. The check processing device 5 also sends the acquired magnetic information to the control device 7. The check processing device 5 also scans the face 2a of the check 2 with the image sensor 16, and sequentially sends the scanning information to the control device 7.

When the scanning information is received from the check processing device 5, the control device 7 acquires the first image G1 (FIG. 4A) and the second image G2 (FIG. 4B).

When synthesized image selection information specifying using the first synthesized image I1 as the synthesized image is input by the operator to the control device 7, the control device 7 generates the first corrected image H1 in which the luminance values of the first image G1 are corrected (see FIG. 5A). The control device 7 also generates the correction function based on the second image G2, and generates the second corrected image H2 by correcting he second image G2 with the correction function (see FIG. 5B). The control device 7 then generates the first synthesized image I1 by combining the first corrected image H1 and second corrected image H2 (see FIG. 8A), and displays this first synthesized image I1 on the display 10.

When the synthesized image selection information input to the control device 7 by the operator specifies using the second synthesized image I2 as the synthesized image, the control device 7 generates the reversed second image J2 as a positive-negative reversal of the second image G2 (FIG. 9A). The control device 7 also generates the second synthesized image I2 combining the first image G1 and reversed second image J2 (FIG. 9B), and displays this second synthesized image I2 on the display 10.

The operator then checks the authenticity of the check 2 based on the synthesized image (the first synthesized image I1 or the second synthesized image I2) shown on the display 10. More specifically, the operator inspects the security image 12 that appears in the synthesized image (first synthesized image I1 or second synthesized image I2) on the display 10. The operator also checks the payment information based on the synthesized image (first synthesized image I1 or second synthesized image I2) and the check 2, and inputs the information required to settle payment to the main unit 8 through the input device 9.

When the information required to settle payment is input, the payment process is executed based on the input information and the magnetic information. When payment is completed, the control device 7 relationally stores the synthesized image (first synthesized image I1 or the second synthesized image I2) with transaction information including the payment date, the magnetic information, and the input information. The control device 7 also sends a print command to the check processing device 5 and prints an endorsement on the check 2.

Instead of separately storing a first image G1 of the check 2 when exposed to visible light and a second image G2 of the check 2 when exposed to ultraviolet light as proof of payment by the check 2, this example stores a synthesized image (first synthesized image I1 or second synthesized image I2) combining these images. The amount of image data stored as proof of payment can therefore be suppressed.

A drop in luminance and a drop in contrast in the synthesized image (first synthesized image I1 or second synthesized image I2) is also suppressed in this example. The security image 12 can therefore be easily recognized in the synthesized image (first synthesized image I1 or second synthesized image I2). Furthermore, because the security image 12 appears as a low luminance black color in the second synthesized image I2, the security image 12 can be easily recognized.

OTHER EMBODIMENTS

The check processing system 1 may also be configured with the image processing unit 42 of the control device 7 disposed on the check processing device 5 side. In this case, the image processing unit 42 disposed to the check processing device 5 sends the synthesized image (first synthesized image I1 or second synthesized image I2) to the control device 7. Also in this case, the control unit 31 functions as the image processing unit 42 as a result of the control unit 31 of the check processing device 5 running an image processing program.

Note that the check processing device 5 may also have a pair of image sensors 16 on opposite sides of the conveyance path 18 at the image reading position B, and acquire images of both the front and back of the check 2. An image recognition unit that recognizes text and images on the face 2a of the check 2 based on the first image G1 may also be provided.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An image processing device comprising:
   a CPU configured to run a control program thereon;
   a conveyance mechanism configured to convey a check on which UV ink and magnetic ink is printed;
   a magnetic sensor configured to detect the magnetic ink;
   wherein the CPU is configured to drive an image sensor, acquire a first image by reading a surface of the check exposed to a first light, acquire a second image by reading a surface of the check exposed to a second light, wherein the second light has a higher frequency than the first light,
   generate a reversed second image by reversing light and dark in the second image, and
   a synthesized image by combining one or more pixels of the first image and one or more pixels of the reversed second image according to formula (1):

$$Im = Imax \times (I1/Imax) \times (1 - I2/Imax)) \qquad (1)$$

(wherein Im is the luminance of a synthesized pixel, Imax is a maximum luminance value, I1 is the luminance of the pixel in the first image, and I2 is the luminance of the pixel in the second image).

2. The image processing device described in claim 1, wherein:
   the second image includes an image part based on fluorescence from UV ink.

3. An image processing method comprising:
   conveying a check on which UV ink and magnetic ink is printed;
   detecting the magnetic ink using a magnetic sensor;
   acquiring a first image by reading a surface of the check exposed to a first light, and acquiring a second image by reading a surface of the check exposed to a second light, wherein the second light has a higher frequency than the first light, wherein the first light is a visible light that has a higher frequency than an infrared light, and wherein the second light is an ultraviolet light, by an image sensor;
   generating a reversed second image by reversing light and dark in the second image; and
   generating a synthesized image by combining one or more pixels of the first image and one or more pixels of the reversed second image according to formula (1):

$$Im = Imax \times (I1/Imax) \times (1 - I2/Imax)) \qquad (1)$$

(wherein Im is the luminance of a synthesized pixel, Imax is a maximum luminance value, I1 is the luminance of the pixel in the first image, and I2 is the luminance of the pixel in the second image).

4. The image processing method described in claim 3, wherein:
   the second image includes an image part based on fluorescence from UV ink.

5. A program that operates on a control device, comprising a CPU configured to run a control program thereon, that controls driving an image sensor, the program causing the control device to function as:
   a magnetic sensor configured to detect the magnetic ink;
   wherein the CPU is configured to drive the image sensor, acquires a first image by reading a surface of a check exposed to a first light, acquire a second image by reading a surface of the check exposed to a second light, wherein the second light has a higher frequency than the first light, wherein the first light is a visible light that has a higher frequency than an infrared light, and wherein the second light is an ultraviolet light, the check being printed on by UV ink and magnetic ink,
   generate a reversed second image by reversing light and dark in the second image, scan an image, and
   generate a synthesized image by combining one or more pixels of the first image and one or more pixels of the reversed second image according to formula (1):

$$Im = Imax \times (I1/Imax) \times (1 - I2/Imax)) \qquad (1)$$

(wherein Im is the luminance of a synthesized pixel, Imax is a maximum luminance value, I1 is the luminance of the pixel in the first image, and I2 is the luminance of the pixel in the second image).

6. The image processing device described in claim 1, wherein Imax is equal to 255.

7. The image processing method described in claim 3, wherein Imax is equal to 255.

8. The program that operates on the control device described in claim 5, wherein Imax is equal to 255.

* * * * *